United States Patent [19]

Köder et al.

[11] 4,389,883

[45] Jun. 28, 1983

[54] METHOD OF AND ARRANGEMENT FOR DETERMINING THE AXIAL PLAY BETWEEN THE STATOR AND THE ROTOR OF AN ELECTRIC MOTOR

[75] Inventors: Manfred Köder, Gerlingen; Günther Schmid, Stuttgart, both of Fed. Rep. of Germany

[73] Assignee: Robert Bosch GmbH, Stuttgart, Fed. Rep. of Germany

[21] Appl. No.: 298,165

[22] Filed: Aug. 31, 1981

[30] Foreign Application Priority Data

Nov. 26, 1980 [DE] Fed. Rep. of Germany ....... 3044417

[51] Int. Cl.³ ............................................. G01M 15/00
[52] U.S. Cl. ................................. 73/119 R; 29/732; 73/668
[58] Field of Search ............... 73/119 R, 12, 660, 662, 73/663, 668, 570, 584, 579, 581, 593; 29/732, 821

[56] References Cited

U.S. PATENT DOCUMENTS 3,681,976  8/1972  Schulz, Jr. ......................... 73/584 X
4,283,830  8/1981  Gallizio et al. ...................... 73/12 X

*Primary Examiner*—Jerry W. Myracle
*Attorney, Agent, or Firm*—Michael J. Striker

[57] ABSTRACT

An arrangement for determining the axial play between the stator and the rotor of an electric motor, especially of a small-size electric motor, includes resilient elements which mount the respective electric motor on a stationary support for oscillatory movement relative thereto, an electromagnet which causes the electric motor to oscillate in a predetermined path at such a frequency and amplitude that, so long as there is an axial play between the rotor and axial bearings thereof, the rotor will conduct movement not only with, but also relative to, the stator, which results in axial impacts between the rotor and the axial bearing and in a complex motion of the stator which has the effect of the impacts superimposed on the basic motion. The arrangement further includes a sensor which detects the complex motion and generates an electric signal representative thereof. The electric signal may then be compared with a reference signal and, in the event of discrepancy, which is attributable solely to the effects of the axial play and the resulting impacts, a command signal may be issued which controls the operation of an automatic device adjusting the position of one of the bearings toward reduction or elimination of the axial play.

25 Claims, 3 Drawing Figures

METHOD OF AND ARRANGEMENT FOR DETERMINING THE AXIAL PLAY BETWEEN THE STATOR AND THE ROTOR OF AN ELECTRIC MOTOR

BACKGROUND OF THE INVENTION

The present invention relates to a method of and an apparatus for determining the extent of the axial play between the stator and the rotor of an electric motor, especially of a small-size electric motor.

It is well known in the electric motor manufacturing industry, and especially in the branch thereof which deals with the manufacture of small-size electric motors such as those used in household appliances and the like, that the axial play between the shaft of the rotor and the axially effective bearings which are mounted on the stator of the electric motor is to be reduced or eliminated altogether in order to obtain a reliable and efficient operation of the electric motor after the latter has been put into operation. This is especially true of the aforementioned small-size electric motors which have rather simple constructions and which are to be relatively inexpensive so that the additional cost incurred in manufacturing the various components to exact narrow tolerances is to be avoided so long as the wider tolerances do not deleteriously influence the performance of the respective electric motor or can be eliminated upon assembly of the components.

Bearing this in mind, there has already been proposed an electric motor construction in which an axial play exists between the axial ends of the shaft of the rotor and two axial bearing members mounted on the stator and confining the shaft between themselves upon assembly of the rotor with the stator of the electric motor. The position of one of the bearing members relative to the stator in the axial direction, and thus the axial distance between the bearing members, is adjustable, for instance, in that the one bearing member is provided with external threads which mesh with corresponding internal threads of the stator, so that the turning of the one bearing member about its axis will result in axial displacement thereof.

In this conventional construction, it is necessary first to establish the extent of the axial play between the rotor or its shaft and the axial bearing members, before it is possible to properly position the displaceable bearing member such that the axial play is reduced to a minimum if not eliminated altogether. One known method suited for this purpose is to transfer the assembled electric motor to a play-adjusting station where the terminals of this electric motor are connected to a source of alternating current, so that the rotor commences its rotation. At this time, the presence of the axial play does not have any detrimental effect since the electric motor is being run under no-load conditions. An important objective to be achieved by this trail running of the electric motor is to let the bearings set and to permit the commutator system to run in. Depending on the degree of automation of the series production of such electric motor, impacts from pressurized-air stamping devices or from manually handled synthetic plastic material hammers are directed against the stator or housing of the electric motor, to aid in the setting of the bearings.

Once this is accomplished, the adjustable bearing member, which is constructed as a setting screw in this construction, is manually tightened to such a degree that an analog current measuring device which is interposed between the electric source and the terminals of the electric motor indicates a multiple of the idle run current consumed by the electric motor after the operation of the electric motor has been commenced. During this short-term overloading, the non-adjustable bearing member sets in the axial direction. Another operation accomplished as a result of this excessive tightening is a secure seating of the abutment members which are inserted into the shaft of the rotor at its two ends. When these abutment members are made as caps of synthetic plastic material which contact the respective bearing members, as they often are in small-size electric motors, the excessive tightening of the adjustable bearing member or setting screw also results in a desirable partial flattening thereof. Thereafter, the setting screw is loosened and then again tightened, but this time only until the analog current measuring device indicates that the electric motor consumes an amount of electric current which is only insignificantly higher than the idle current consumed by the electric motor when the axial play still existed. In this manner, the adjustment of the longitudinal or axial play is terminated, and the setting screw is affixed in its then assumed position.

A significant disadvantage of this conventional approach stems from the fact that the bearings, the commutator system, and the transmission which is present in the stator housing of this conventional small-size electric motor are not completely the same in terms of mechanical behavior from one motor of the series to another. The encountered differences in mechanical behavior and properties cause different consumptions of the electric current when the electric motors are being operated in the idle mode, which differences may then be reflected in an inaccurate adjustment of the axial play. In order to at least partially compensate for this disadvantageous effect, the person tightening the setting screw has to have a special experience and be very dexterous. This situation brings about certain problems especially when it is desired to increase the degree of automation of the manufacturing process.

SUMMARY OF THE INVENTION

Accordingly, it is a general object of the present invention to avoid the disadvantages of the prior art.

More particularly, it is an object of the present invention to develop a method of determining the extent of axial play between the stator and the rotor of an electric motor, which is not possessed of the disadvantages of the conventional methods of this kind.

Another object of the invention is to present a method of the type here under consideration by means of which the results of measuring of the axial play are not falsified by different friction coefficients at the bearings, commutator system, and in the built-in transmission.

A further object of the invention is to provide a method which can be practiced without energization of the electric motor so that any damages which could result from rotation of the rotor before the setting of the various components of the electric motor are avoided, and yet not only the setting of such components, but also flattening of the synthetic plastic material caps is achieved thereby.

A concomitant object of the present invention is to so construct an arrangement for performing the method of the present invention as to be simple in construction, inexpensive to manufacture, easy to use, and reliable nevertheless.

It is still another object of the invention to so construct the arrangement of the type here under consideration as to readily lend itself to use in a fully automated production line.

In pursuance of these objects and others which will become apparent hereafter, one feature of the present invention resides in a method of determining the extent of axial play between the rotor and two axially spaced axial bearings mounted on the stator of an electric motor, especially of a small-size electric motor, which method comprises, briefly stated, the steps of applying to the electric motor forces of such orientation and duration that the rotor conducts axial movement relative to the stator and abuts at least one of the bearings with an impact force indicative of the extent of the axial play; and sensing the magnitude of the impact force for use in determining the extent of the axial play. Advantageously, the applying step includes oscillating the electric motor in a closed path such that the force acting on the electric motor has at least axial components of reversing directions acting on the rotor and on the stator of the electric motor and such that the rotor will move in the respective axial direction at a speed exceeding the speed of the stator in the same direction as the electric motor moves in a reversing portion of the path. Then, the sensing step advantageously includes detecting the axial component of movement of the electric motor at least as the latter moves in the reversing portion of the path, and segregating from the motion attributable to the joint movement of the stator and the rotor the motion peaks attributable to the action of the impact force. It is also advantageous when an electrical signal is generated which is representative of the magnitude of the motion peaks after the segregation thereof from the basic motion.

The method of the present invention finds a particularly advantageous use in connection with an electric motor in which the axial spacing between the bearings is adjustable, in that the electrical signal can then be used for adjusting the axial spacing between the axial bearings and thus the extent of the axial play. The axial play may be reduced to the desired extent, or eliminated altogether. In this context, it is particularly advantageous to use the electrical signal for controlling the operation of an automatic device operative for adjusting the axial spacing. The electric motor need not be energized, and hence the rotor thereof need not rotate relative to the stator, during the axial play determination; however, the method of the present invention may as well be performed while the electric motor is running in the idle mode. These features of the present invention render it possible to perform the axial play determination, inclusive of the positional adjustment of the adjustable bearing, in a fully automatic manner without human intervention.

The arrangement for performing the method of the present invention basically includes means for applying to the electric motor forces of such orientation and duration that the rotor of the electric motor conducts axial movement relative to the stator and abuts at least one of the bearing members which confine the rotor between themselves with an impact force indicative of the extent of the axial play; and means for sensing the magnitude of the impact force for use in determining the extent of the axial play. A particularly simple and otherwise advantageous construction of the arrangement is obtained when the applying means includes a support, holding means, especially pneumatically operated clamping means, for the electric motor, means for mounting the holding means on the support for movement in a predetermined path relative thereto, and electromagnetic means for imparting oscillatory movement to the holding means and thus to the electric motor held thereby, and when the sensing means includes means for generating an electrical signal representative of the oscillatory motion of the electric motor, including an electromechanical transducer having a sensing portion in contact with the stator of the electric motor.

The sensing means may advantageously further include means for indicating the magnitude of the electrical signal, including an indicator connected to the output of the transducer.

According to a further advantageous concept of the present invention, the applying means includes means for controlling the operation of the electromagnetic means, such controlling means being interposed between a source of electric current and the electromagnetic means. Such controlling means may include an amplitude regulator; however, it is also possible to include a frequency regulator in the controlling means.

The aforementioned clamping device may be constructed to engage the stator of the electric motor at its circumferential surface; however, it is also possible and advantageous to so construct the clamping device as to engage the stator of the electric motor at one of its ends.

A particularly advantageous application of the above-discussed features of the arrangement of the present invention can be found when the electric motor is of the type in which one of the bearing members is accessible from the exterior of the stator and has a thread which engages a mating thread of the stator. Then, the arrangement of the present invention advantageously further includes means for adjusting the axial spacing between the bearing members in dependence on the electrical signal, including a threading device engaged with the one bearing member during the adjusting operation and operative for turning the same in engagement with the mating threads, and controlling means having an input connected to the transducer and an output connected to the threading device and operative for converting the electrical signal into a command signal for operating the threading device. The controlling means advantageously includes an adjustable amplifier which may be arranged in such a circuitry as to act as an impedance transducer. It is especially advantageous when the threading device includes a stepping reversible electric motor. This arrangement readily lends itself to use in a fully automated production line, particularly when the controlling means includes, in accordance with a further aspect of the present invention, means for generating a reference signal, and means for comparing the electrical signal with the reference signal and for delivering a command signal to the output of the controlling means in the event of discrepancy between such signals for operating the threading device. The sensing portion of the transducer advantageously contacts the stator of the electric motor in the vicinity of one of the bearing members, especially the adjustable one.

The novel features which are considered as characteristic of the invention are set forth in particular in the appended claims. The improved axial play determining arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
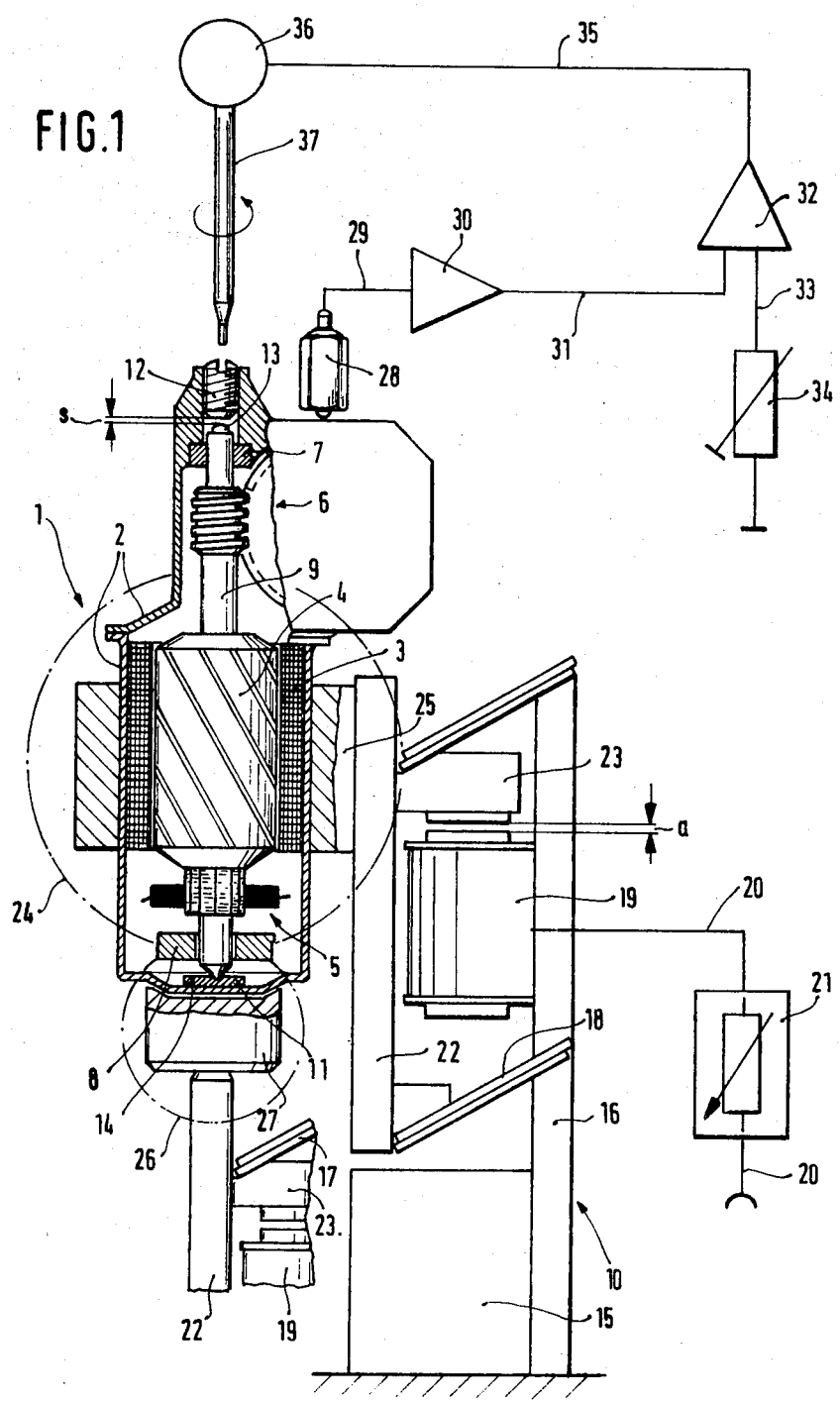
FIG. 1 is a side elevational view of an arrangement of the present invention for determining the axial play between the stator and the rotor of an electric motor, illustrating two alternatives of a suspension for the electric motor.

Referring now to the drawing in detail, and first to FIG. 1 thereof, it may be seen that it illustrates two alternative constructions of the arrangement for determining the extent of axial play between the stator and the rotor of an electric motor 1, these constructions being so similar to one another that the same reference numerals have been used to identify the corresponding parts thereof. The two alternatives are indicated in FIG. 1 by two circles shown in dash-dotted lines in the center and at the lower part of the arrangement, respectively.

The electric motor 1 which is to be tested for the presence of the axial play and in which the extent of such play is to be reduced or eliminated altogether is illustrated in FIG. 1 as being of the built-in transmission type. The stator of this electric motor 1 includes a bipartite housing 2 and a stator winding 3, while the rotor includes a shaft 9 and an armature 4 mounted on the shaft 1 for rotation therewith. The electric motor 1 further includes a commutator system 5, a transmission 6, and radial bearings 7 and 8 for the shaft 9.

The electric motor 1 is shown to be clamped in an oscillating arrangement 10. At the lower end of the electric motor 1 as considered in the clamped position shown in FIG. 1, a lower axial bearing member 11 for the shaft 9 is arranged in the interior of the housing 2. A setting screw 12 is disposed opposite the lower bearing member 11, this setting screw 12 serving as an upper axial bearing member for the shaft 9, again as considered in the illustrated position of the electric motor 1. The respective ends of the shaft 9 receive caps 13 and 14 of synthetic plastic material. The caps 13 and 14 are pressed into corresponding depressions or recesses provided at the end faces of the shaft 9.

As shown in FIG. 1, after the assembly, a clearance or axial play s exists between the shaft 9 with the caps 13 and 14 and the bearing members 11 and 12. When only the forces of gravity act on the various components of the electric motor 1 in the illustrated position thereof, the clearance s will be present between the upper bearing member or setting screw 12 and the upper end cap 13. However, should other axial forces act on the electric motor 1 as well in opposition to the gravity, the clearance s may become transferred to the other end of the shaft 9, and be present between the lower cap 14 and the lower bearing member 11.

The oscillating arrangement 10 includes a base 15 and a carrier 16 which together constitute a support. Resilient suspension elements 17 and 18 and an electromagnet 19 are mounted on the carrier 16. The electromagnet 19 is connected to the electric mains via electric wires 20 which have a regulating unit 21 interposed therein. The free ends of the suspension elements 17 and 18 carry an oscillatory member 22 which has an armature 23 forming a part of the electromagnetic means mounted thereon. The armature 23 is so mounted on the oscillatory member 22 that it is spaced by a distance a from the electromagnet 19 when the latter is deenergized. The distance a corresponds to the extent of oscillation of the oscillatory system including the oscillatory member 22.

As already mentioned at the outset, FIG. 1 shows two alternative constructions of the oscillating arrangement 10, particularly differing from one another in the manner in which they carry and engage the electric motor 1. One of these constructions is partially enclosed by a circle 24 and includes a clamping device 25 which surrounds the housing 2 of the electric motor 1 at the region of the stator winding 3. The clamping device 25 is preferably of the pneumatically operated type and its structure is fully conventional so that the details thereof have not been shown in the drawing in order not to unnecessarily encumber the same. The operation of the clamping device 25 is controlled, again in a conventional manner, by a control arrangement which controls the supply of pressurized air to the control device 25 and the discharge of air therefrom. The other construction is partially included within another circle 26. Here, the oscillatory member 22 is connected to the housing 2 of the electric motor 1 in its longitudinal direction by means of a clamping member 27.

The regulating unit 21 is so constructed, in accordance with well known principles, as to be operative for controlling the amplitude as well as the frequency of the oscillations of the oscillatory member 22. A sensing element 28 contacts the housing 2 of the electric motor 1 in the vicinity of the setting screw 12 and of the radial bearing 7. This sensing element is constructed as an electromechanical transducer and is connected by an electrical conduit 29 with an amplifier 30 which is so arranged in a circuit as to act as an impedance transducer. Another electrical conduit 31 connects the output of the amplifier 30 with an input of a control unit 32. Another input of the control unit 32 is connected by a still another electric conduit 33 with a reference signal generator 34. The output of the control unit 32 is connected by an electric command conduit 35 with the control input of a threading or turning device 36. Thus, the control unit 32, together with the amplifier 30 and with the reference signal generator 34, form an arrangement for controlling the operation of the threading device 36. The threading device 36 includes a tool 37 which engages the setting screw 12.

As soon as the electromagnet 19 and the armature 23 associated therewith cause the oscillatory member or rail 22 to swing upon energization of the electromagnet 19 with a frequency and amplitude determined by the regulating unit 21, the shaft 9 and the armature 4 of the rotor of the electric motor 1 are also caused to oscillate substantially in the axial direction, partially with, and partially relative to, the stator 2, 3, due to the existence of the axial play s. This means that pronounced peaks attributable to the impact forces resulting from the impacts of the caps 13 and 14 against the lower bearing member 11 and the upper bearing member or setting screw 12, respectively are superimposed on the basic sinusoidally developed motion of the electric motor 1 as a function of time. The sensing element or device 28 which operates as an electromechanical transducer converts this oscillation spectrum into an electrical signal which is transmitted through the amplifier 30 into the control unit 32. The control unit 32 compares this electrical signal with a reference signal originating in the reference signal generator 34 and derives a command signal for controlling the operation of the motor of the threading device 36 from the result of this comparison. The motor of the threading device 36 then rotates the tool 37 which engages and, consequently, jointly turns the setting screw 12, and this operation is continued for so long as there still exists some axial clearance or play between the bearings 11 and 12, on the one hand, and the end caps 13 and 14 of the shaft 9, on the other hand and, consequently, the deviating peaks superimposed on the basic sinusoidal motion which result in the generation of the command signals by the control unit 32. The end caps 13 and 14 of the shaft 9, which are made of a deformable synthetic plastic material, are flattened in the desired manner during this adjustment operation due to the imacts acting thereon as a result of the movement of the rotor 4, 9 in the axial direction relative to the stator 2, 3. Also, the bearings 7, 8 assume their aligned positions and settle in the bores provided therefor, in an automatic manner, without encountering the frictional losses which were previously present when the axial play was adjusted during the rotation of the rotor. It is assured in the abovediscussed manner that the command signal which controls the extent of axial adjustment is exclusively derived from the actually existing axial play of the shaft 9.

Figure 2:
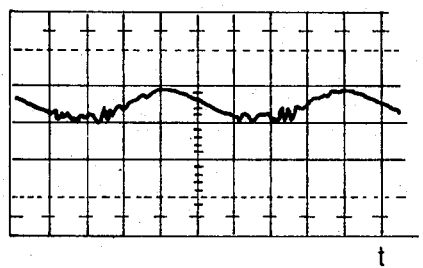
FIG. 2 is a graphic representation of the measurement results obtained when using the arrangement of FIG. 1 while axial play between the stator and the rotor of the electric motor still exists.
Figure 3:
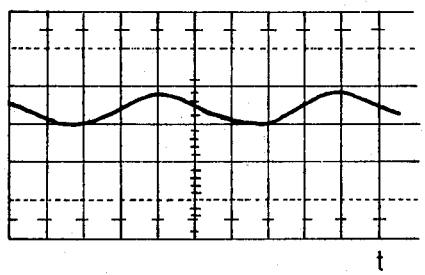
FIG. 3 is a graphic representation corresponding to that of FIG. 2 but showing the measurement results obtained after the axial play has been eliminated.

FIG. 2 graphically illustrates the complex motion which results from the superimposition of the effects of the axial play onto the basic sinusoidal motion, as a function of time, wherein the ordinate may represent the actual motion or the respective value of the electrical signal produced by the transducer 28 and representative of such motion. On the other hand, FIG. 3 graphically illustrates the motion obtained after the axial play has been completely eliminated, that is, when the stator 2,3 and the rotor 4,9 only conduct shared motion and there is no superimposed motion attributable to the effect of such play any longer. The proportions illustrated in FIG. 2 between the basic and the superimposed motion correspond to the effect of an axial play amounting to approximately 5/100 mm.

It will be understood that each of the elements described above, or two or more together, may also find a useful application in other types of arrangements differing from the type described above. So, for instance, the transducer 28 could be so arranged as to pick up only the superimposed motion rather than the complex motion resulting from the superimposition, in which case the arrangement could be further simplified.

While the invention has been illustrated and described as embodied in an arrangement for determining the extent of the axial play between the rotor and two axial bearing members mounted on the stator of a small-size electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A method of determining the extent of axial play between the rotor and two axially spaced axial bearings mounted on the stator of an electric motor, especially of a small-size electric motor, comprising the steps of applying to the electric motor forces of such orientation and duration that the rotor conducts axial movement relative to the stator and abuts at least one of the bearings with an impact force indicative of the extent of the axial play; and sensing the magnitude of the impact force for use in determining the extent of the axial play.

2. The method as defined in claim 1, wherein said applying step includes oscillating the electric motor in a closed path such that the forces acting on the electric motor have at least axial components of reversing directions acting on the rotor and on the stator of the electric motor and such that the rotor will move in the respective axial direction at a speed exceeding the speed of the stator in the same direction as the electric motor moves in a reversing portion of the path.

3. The method as defined in claim 2, wherein said sensing step includes detecting the axial component of movement of the electric motor at least as the latter moves in the reversing portion of the path, and segregating from the motion attributable to the joint movement of the stator and the rotor the motion peaks attributable to the action of the impact force.

4. The method as defined in claim 3, wherein said sensing step further includes generating an electrical signal representative of the magnitude of the motion peaks.

5. The method as defined in claim 4 for use in an electric motor in which the axial spacing between the bearings is adjustable; and further comprising the step of utilizing the electrical signal for adjusting the axial spacing and thus the extent of the axial play.

6. The method as defined in claim 5, wherein said utilizing step includes reducing the axial spacing until the axial play is eliminated.

7. The method as defined in claim 5, wherein said utilizing step includes using the electrical signal for controlling the operation of an automatic device operative for adjusting the axial spacing.

8. The method as defined in claim 1; and further comprising the step of keeping the rotor from rotating relative to the stator during the determination of the axial play.

9. The method as defined in claim 1; and further comprising the step of rotating the rotor relative to the stator during the determination of the axial play.

10. An arrangement for determining the extent of axial play between the rotor and two axially spaced bearing members mounted on the stator of an electric motor, especially of a small-size electric motor, comprising means for applying to the electric motor forces of such orientation and duration that the rotor conducts axial movement relative to the stator and abuts at least one of the bearing members with an impact force indicative of the extent of the axial play; and means for sensing the magnitude of the impact force for use in determining the extent of the axial play.

11. The arrangement as defined in claim 10, wherein said applying means includes a support, holding means for the electric motor, means for mounting said holding means on said support for movement in a predetermined path relative thereto, and electromagnetic means for imparting oscillatory movement to said holding means; and wherein said sensing means includes means for generating an electrical signal representative of the oscillatory motion of the electric motor, including an electromechanical transducer having a sensing portion in contact with the stator.

12. The arrangement as defined in claim 11, wherein said sensing means further includes means for indicating the magnitude of the electrical signal, including an indicator connected to said transducer.

13. The arrangement as defined in claim 11; further comprising means for supplying electric current; and wherein said applying means further includes means for controlling the operation of the electromagnetic means interposed between said supplying means and said electromagnetic means.

14. The arrangement as defined in claim 13, wherein said controlling means includes an amplitude regulator.

15. The arrangement as defined in claim 13, wherein said controlling means includes a frequency regulator.

16. The arrangement as defined in claim 11, wherein said holding means includes a clamping device for the electric motor.

17. The arrangement as defined in claim 16, wherein said clamping device is a pneumatically operated clamping device.

18. The arrangement as defined in claim 16, wherein said clamping device is constructed to engage the stator of the electric motor at its circumference.

19. The arrangement as defined in claim 16, wherein said clamping device is constructed to engage the stator of the electric motor at one of its ends.

20. The arrangement as defined in claim 11 for use in an electric motor in which one of the bearing members is accessible from the exterior of the stator and has a thread engaging a mating thread of the stator; further comprising means for adjusting the axial spacing between the bearing members in dependence on the electrical signal, including a threading device engaged with the one bearing member during the adjusting operation and operative for turning the same in engagement of the mating threads, and controlling means having an input connected to said transducer and an output connected to said threading device and operative for converting said electrical signal into a command signal for operating said threading device.

21. The arrangement as defined in claim 20, wherein said controlling means includes an adjustable amplifier.

22. The arrangement as defined in claim 20, wherein said controlling means includes an impedance transducer.

23. The arrangement as defined in claim 20, wherein said threading device includes a stepping reversible electric motor.

24. The arrangement as defined in claim 20, wherein said controlling means includes means for generating a reference signal, and means for comparing said electrical signal with said reference signal and for delivering a command signal to the output of said controlling means in the event of discrepancy between such signals for operating the threading device.

25. The arrangement as defined in claim 11, wherein said sensing portion of said transducer contacts the stator of the electric motor in the vicinity of one of the bearing members.

* * * * *